Figure 4:
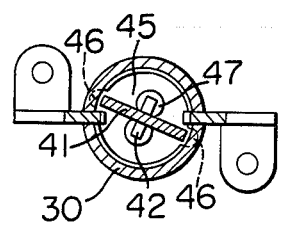

United States Patent [19]

Nakahara

[11] 4,291,626
[45] Sep. 29, 1981

[54] ASSEMBLY OF PIEZOELECTRIC ELEMENT UNIT AND SHEET METAL MOUNT FOR IGNITION DEVICE

[75] Inventor: Kazumi Nakahara, Nagoya, Japan

[73] Assignee: NGK Spark Plug Co. Ltd., Nagoya, Japan

[21] Appl. No.: 26,890

[22] Filed: Apr. 4, 1979

[30] Foreign Application Priority Data

Apr. 7, 1978 [JP]   Japan ............................ 53-46404[U]

[51] Int. Cl.$^3$ ............................................. F42C 11/02
[52] U.S. Cl. ................................... 102/200; 102/210; 310/348
[58] Field of Search ................ 102/210, 200; 367/165, 367/173; 310/348, 311

[56] References Cited

U.S. PATENT DOCUMENTS

3,466,474  9/1969  Ochiai ................................. 102/210
3,963,966  6/1976  Mohr ................................... 102/210

*Primary Examiner*—Charles T. Jordan
*Attorney, Agent, or Firm*—Thomas R. Morrison

[57] ABSTRACT

A piezoelectric element unit and sheet metal mount therefor has a window opening for readily mounting the unit therein without the necessity for using tools and for stably holding it despite repetitive beating by the hammer of the actuation mechanism. The unit is formed as a cylinder with a pair of opposite grooves axially extending in or on the circumferential surface of the unit so as to engage the side edges of said window. When the grooves are cut directly in the circumferential wall of the unit, a second window formed to be interconnected with the aforementioned window for mounting the actuation mechanism is designed to have a width longer than the diameter of the unit so that the unit is first located in the second window and then slid into the first window. When the grooves are formed by two rows of upper and lower axial protrusions therebetween, notches are formed at the opposite edges of the window so that either of the upper and lower protrusions may clear the notches in order that the unit may be slid into its final position.

3 Claims, 11 Drawing Figures

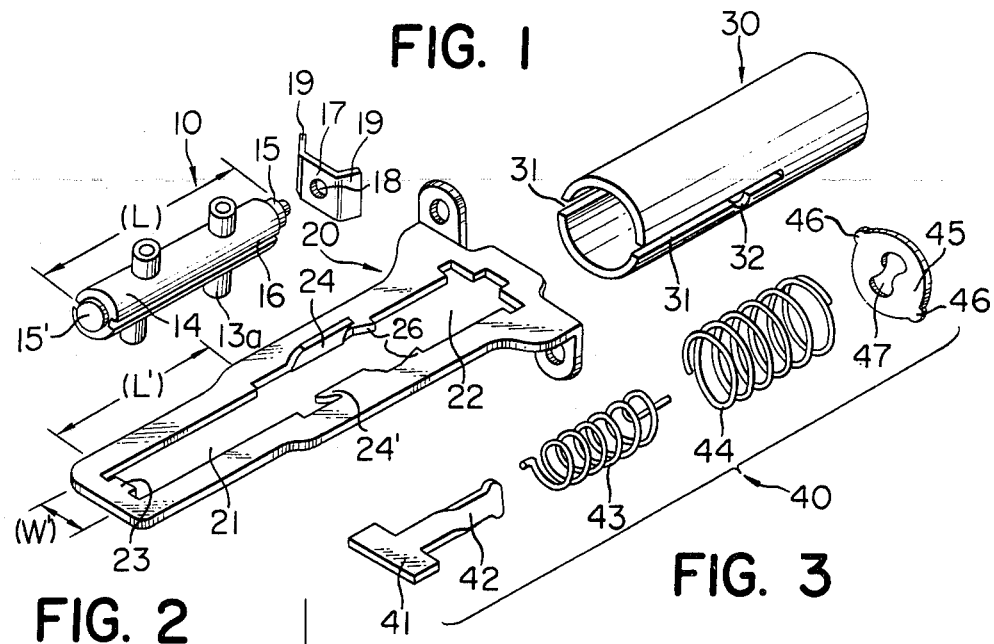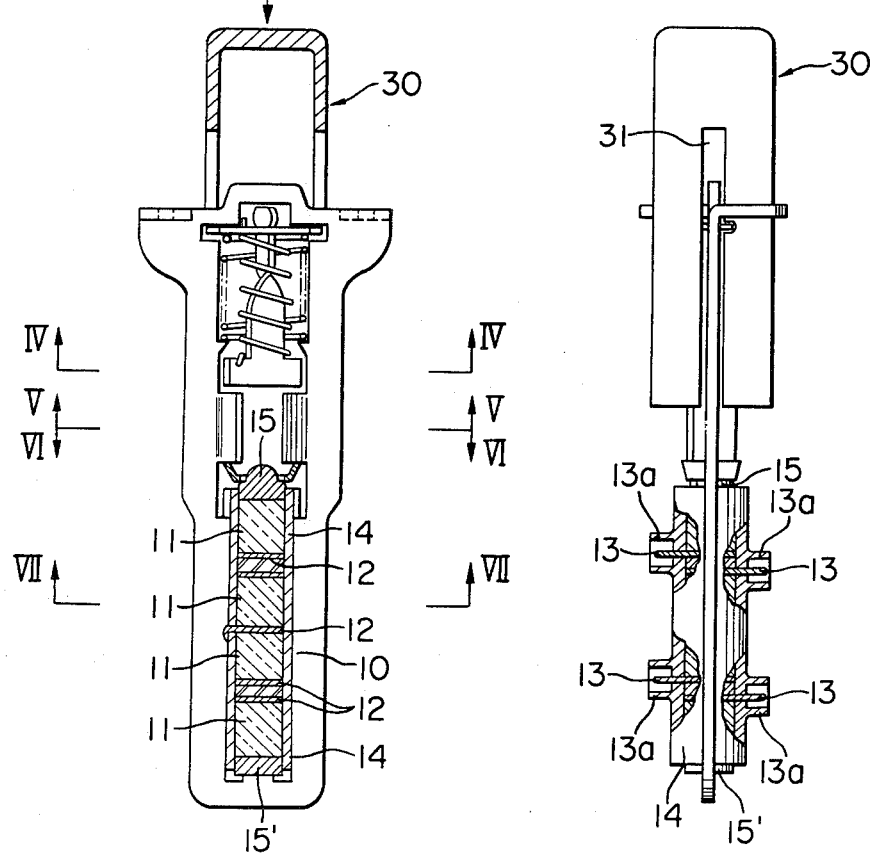

ASSEMBLY OF PIEZOELECTRIC ELEMENT UNIT AND SHEET METAL MOUNT FOR IGNITION DEVICE

The present invention relates generally to an assembly of a piezoelectric element unit and a sheet metal mount for the ignition device thereof, and more particularly to an assembly having a sheet metal mount formed with a window opening in which the piezoelectric unit is readily mounted and stably held.

There have been various ignition devices using a piezoelectric unit. As well known a cylindrical piezoelectric unit comprising one or a plurality of elements is hammered at one end thereof for causing mechanical stress therein so as to produce electric energy for generating a discharge arc across electrodes electrically connected with said piezoelectric unit.

There have been proposed various types of devices for the hammering which commonly comprise a hammer, spring means and actuation means so arranged and mounted on the frame in addition to the piezoelectric unit that when operating said actuation means said hammer is released to suddenly move against one end of said unit for hammering by virtue of said spring means.

Repetition of the above hammering operations often causes angular or radial displacement of the piezoelectric unit relative to the hammer which will naturally adversely affect reliable actuation of the ignition device.

An object of the invention is thus to provide an assembly having a piezoelectric unit which is mounted on a sheet metal mount together with the beating device without requiring any particular tool for assembling and which will stably hold it in position for an extended long time.

Said object is attained according to the invention essentially by forming a pair of opposite grooves axially extending on the circumferential surface of the cylindrical piezoelectric unit and forming a window opening in the sheet metal mount so that the unit is held by engagement of the opposite side edges of the sheet metal mount window respectively with said axial grooves of the cylindrical unit.

Figure 5:
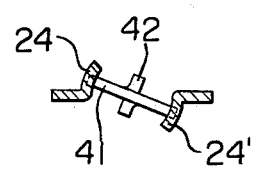
Figure 6:
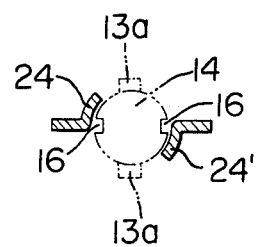
Figure 7:
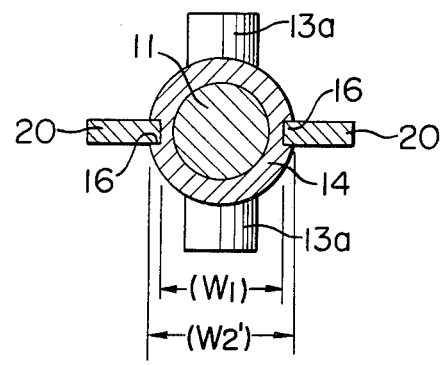
Figure 8:
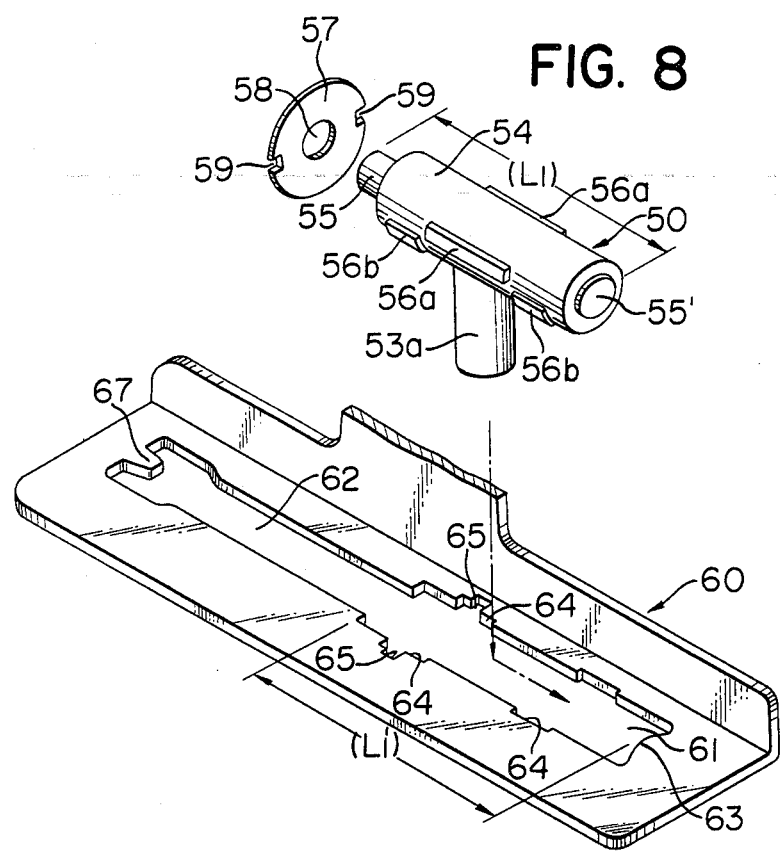
Figure 9:
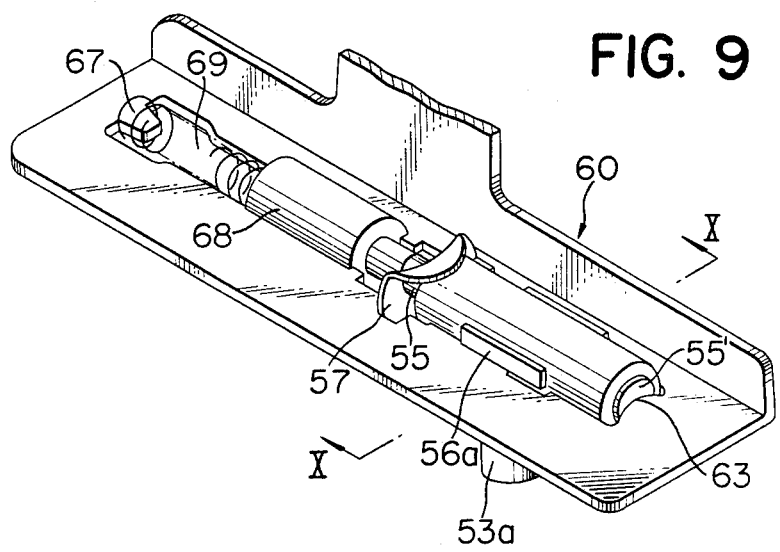
Figure 10:
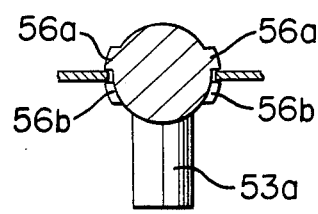
Figure 11:
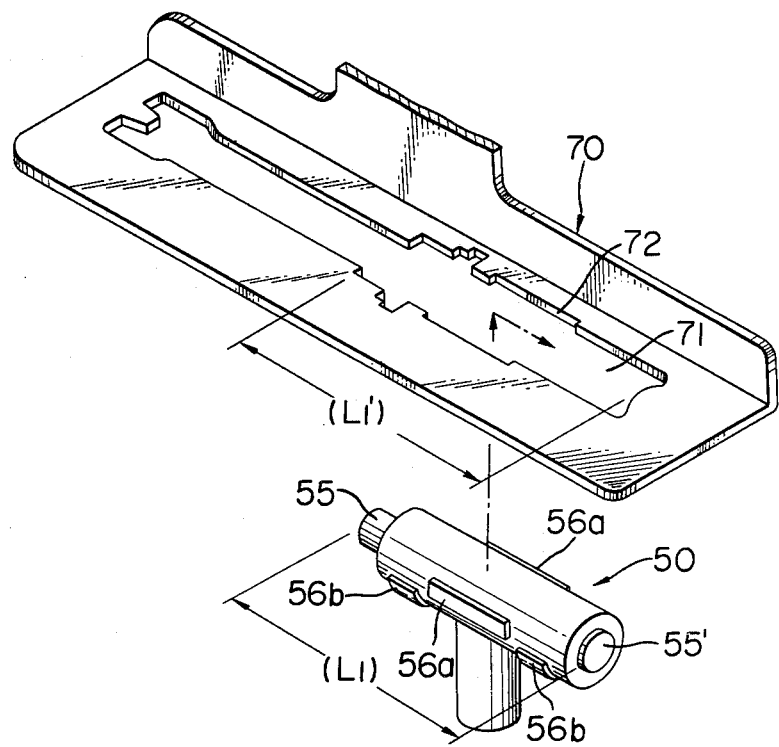

Other objects and various advantages of the invention may be readily understood by reading the explanation to be made hereinafter on preferred embodiments with reference to the accompanying drawings, in which;

FIG. 1 is a perspective exploded view of the sheet metal mount, the piezoelectric unit and the beating device members according to a first embodiment of the invention, FIG. 2 is a plan view of the device of FIG. 1 partly in section, FIG. 3 is a side elevation of the device of FIG. 1 partly in section, FIGS. 4, 5 and 6 are sections respectively taken along the lines IV—IV, V—V and VI—VI in FIG. 2, FIG. 7 is a section in an enlarged scale taken along the line VII—VII in FIG. 2, FIG. 8 is a perspective exploded view of a piezoelectric unit according to a second embodiment of the invention, FIG. 9 is a perspective assembled view of the embodiment of FIG. 8, FIG. 10 is a section taken along the line X—X in FIG. 9, and FIG. 11 is a perspective exploded view similar to FIG. 8 of a third embodiment of the invention.

Now in reference to FIGS. 1 through 7, the piezoelectric unit is represented generally by 10 which comprises four stacked elements 11 as best shown in FIGS. 2 and 3 which are electrically separated from each other by an insulation material disc 12 so as to provide four electric terminals 13 for concurrent four ignitions. Of course the adjacent two elements may be connected in parallel to provide only one electric output terminal or the unit may consist of only one element. The unit 10 in this embodiment has a cylindrical sleeve 14 of an insulation material to contain the four elements 11 and end metal discs 15, 15' for hammering and for holding the piezoelectric unit 10. As best shown in FIG. 3, there are formed around the circumferential surface of the cylindrical sleeve 14 four cups 13a of an insulation material each surrounding the concerned output terminal 13.

According to the invention, it is characterized by forming a pair of axially extending grooves 16 in the circumferential surface of the cylindrical sleeve 14 of the conventional piezoelectric unit 10, as best shown in FIG. 1.

There is provided according to the invention a sheet metal mount represented generally by 20. The mount 20 is formed by press punching a sheet metal to provide a first window opening 21 and a second window opening 22 interconnected with the former. The first window opening 21 is for holding the piezoelectric unit 10 stably therein and has a length (L') substantially the same as the length (L) of the cylindrical unit 10 and a width (W') a little larger than the diametric distance ($W_1$) (see FIG. 7) between the bottoms of the grooves 16. The width of the grooves is a little larger than the thickness of the sheet metal. The second window 22 has a length larger than the length (L) of the unit 10 and a width larger than the diameter ($W_2$) of said unit 10.

In order to insert the unit 10 in said first window opening 21, it is located in the second window 22 and then slidingly moved toward the first window 21 thus engaging the opposite side edges of said window 21 respectively with the axial grooves 16 in unit 10. The tail end disc 15' of the unit 10 abuts the end edge of the window 21. It is preferable to provide an inwardly protruded tongue 23 at said end edge for stable engagement with said end disc 15'.

In order for the unit 10 not to axially move in said window 21, a stopper 17 having a central hole 18 for fitting the protruding pin of the unit head end disc 15 and bent portions 19 for engaging respectively the roots of upwardly and downwardly bent portions 24, 24' in the second window 22 which may be used also for holding the hammer actuation mechanism which itself is not the subject of the invention.

The location of the unit 10 in the second window 22 is shown in FIG. 6 in which the unit 10 is illustrated in phantom lines and said upwardly and downwardly bent portion 24, 24' are shown in section. It is clear that the larger width of said second window 22 and said bent portions 24, 24' will not hinder the unit 10 to be located therein. The status of the unit 10 held in the first window 21 is shown in FIG. 7, in which it is clear that engagement of the side edges of the window 21 with the axial grooves 16 of the unit 10 will prevent radial or angular displacement of the unit 10 in said first window 21. The unit 10 is axially held between the tongue 23 and the stopper 17 fixed to the mount 20 without allowing any axial displacement.

Since the hammer actuation mechanism is not the subject of the invention, explanation thereof shall be made briefly only for the purpose of showing how repetition of the actuation affects on holding of the piezoelectric unit in position. Other actuation mechanisms can be applied to the assembly of the invention.

A push button represented generally by 30 in the form of a hollow cylinder, one end only of which is open, has a pair of opposite slits 31 formed in the circumferential wall thereof for axially extending from said open end to some extent so as to be slidingly movable by fitting said slits on the plate portions of the mount 10 along said second window 22. Said slits 31 have respectively notches 32 diametrically arranged so as to leave a necessary distance for the actuation to be referred hereafter from said notch to the closed end of said slit.

A hammering mechanism represented generally by 40 in FIG. 1 comprises a substantially "T" shaped hammer having a head 41 and a leg 42 twisted by an angle of nearly 90° (see FIGS. 4 and 5), a first coiled spring 43, a second coiled spring 44 of a larger diameter and a disc member 45 arranged between the push button 30 and said hammer 41-42 and having oppositely arranged protrusions 46 as well as a nearly vertical slot 47 (see FIG. 4).

Said first coiled spring 43 is inserted on said hammer leg 42 to be fixed at one end thereof to the hammer head 41. Said disc member 45 is engaged at the slit 47 thereof with the free end of said hammer leg 42 (see FIG. 4) and fixed with said spring 43 at the other end thereof so that when said disc member 45 is moved toward and relative to said hammer head 41 said disc member 45 moving along the twisted leg 42 may cause relative angular movement therebetween and concurrently compression of said coiled spring 43.

Before the said disc member 45 engages said hammer leg 42, said larger diameter coiled spring 44 is inserted around said first spring 43 so that one end thereof is engaged with inwardly protruded stoppers 26 in the mount second window 22 and the other end is fixed to said disc member 45.

It will be appreciated that when inserting the push button cylinder 30 on said assembly of the hammer 41-42, the first spring 43, the second spring 44 and the disc member 45 which is set in said second window 22 so that said disc member 45 is positioned at the end of said second window, said one end of the outer spring 44 is engaged with the inward protrusions 26 and the hammer head 41 abuts on the roots of upwardly and downwardly bent portions 24, 24', then the outward protrusions 46 of the disc 45 engage in the concerned slits 31. When further pushing the button cylinder 30, said disc protrusions 46 may fit respectively in the concerned notches 32 due to a little inclination of the free end of the hammer leg 42 and the disc slot 47 relatively to the correctly vertical position.

If the cylinder 30 of the assembled mechanism is pushed against the force of the coiled springs 43, 44 until the closed ends of the slits 31 abut on the concerned mount end, The disc member 45 is accompaniedly moved in the second window 22 toward the piezoelectric unit 10 so that the disc member 45 is slidingly moved along the twisted hammer leg 42 thus compressing the first spring 43 relative to the hammer head 41 engaged with bent portions 24, 24'. Said disc member movement along the twisted leg 42 causes relative angular rotation, but since the disc member 45 cannot angularly move the hammer head 41 is forcedly rotated so as to be disengaged from said upwardly and downwardly bent portions 24, 24'. Thus the hammer 24, 24' is suddenly pushed toward the actuation head 15 of the piezoelectric unit 10 by virtue of the compressed spring 43. The push button 30 is returned to the initial or normal position by virtue of the outer or second spring 44, since said one end of the spring 44 is fixed to the mount at said inward protrusions 26 and the other end is fixed to said disc member 45 of which protrusions 46 is engaged with the notches 32.

Now in reference to FIGS. 8 through 10, the second embodiment shall be explained, in which each of the axial grooves of the piezoelectric unit are formed by two rows of axially extended protrusions. The unit is represented generally by 50 which comprises a cylindrical sleeve 54 of any insulation material containing one or a plurality of piezoelectric elements therein and end discs 55, 55'. An electric output terminal is covered by an insulation material cut 53a. There are provided on the circumferential surface of the sleeve 54 an axially extended upper protrusion 56a and two axially extended lower protrusions 56b so as to provide an axially extending groove therebetween. Similar protrusions 56a and 56b are formed on the circumferential surface at the opposite side. It is noted that the number and arrangement of such protrusions are not limited to the illustrated embodiment.

As best shown in FIG. 8, the mount represented generally by 60 is formed by press punching from sheet metal. Similar to the preceeding embodiment, a first window opening 61 for holding the unit 50 and a second window opening 62 for holding the hammering means interconnected with said first window are provided. At the end of said first window 61, an inward projection 63 is preferably formed for stable holding of the unit 50 at the end disc 55'.

Different from the first embodiment, the unit 50 is directly mounted in said first window 61 as shown by the dot-dash line in FIG. 8 in this embodiment. The width of the window 61 is only a little longer than the diameter of the cylindrical unit 50 so that notches 64 are formed at the opposite side edges of the window through which the lower protrusions 56b of the unit 50 may pass .

When lowering the unit 50 as shown by a vertical dot-dash line in FIG. 8, the lower axial protrusions 56b respectively clear the notches 64 but the upper axial protrusions 56a abuts on the mount plate portions at either side of the window 61. Upon sliding the unit 50 in the direction shown by a horizontal dot-dash line in FIG. 8, it is held in the first window 61 as best shown in FIG. 10 with each groove defined by the upper and lower axially extended protrusions 56a, 56b engaged by the side edge of the first window 61 and with the tail end disc 55' abutting the inward projection 63. In order to prevent the unit 50 slidingly moving toward the second window 62, there is provided a disc stopper 57 having a central hole 58 through which the axially protruded portion 55 of the head end disc of the unit 50 may be extended and a pair of notches 59 formed at the diametrically opposite positions around the disc circumference. In order that the stopper 57 fitted on the unit head protrusion 55 may be engaged with the mount 60, a pair of deep notches 65 are formed so that said stopper disc 57 is received therein and then slid a little forward to engage the opposite notches 59 of the stopper.

A modification of said second embodiment is illustrated in FIG. 11. This is different therefrom only in that the unit is set in the first window 71 in the reverse direction as shown by an upward pointing vertical dot-dash line in FIG. 11 and consequently a pair of opposite notches 72 are formed to clear the upper axial protrusions 56a. After that the unit 50 is similarly slid as shown by a horizontal dot-dash line until it is held in the window 71.

I claim:

1. A piezoelectric element unit and a sheet metal mount comprising: a cylindrical piezoelectric unit having first and second opposite grooves each axially extending on the circumferential surface thereof; said first and second grooves having a width only a little larger than the thickness of said sheet metal; an elongated window having opposite side edges in said sheet metal mount; said window having engagement means in said opposite side edges of the mount window for engaging said axial grooves of the unit; and means in said elongated window for permitting preliminary positioning of said unit therein and for axially sliding said unit into engagement with said engagement means.

2. Assembly as claimed in claim 1, in which said axial grooves comprise axial cuts in the circumferential wall of said unit, and said elongated window is divided into a first portion and a second portion, said first portion having a width only a little larger than the diametrical distance between the bottoms of the grooves for stably holding the unit and said second portion having a width larger than the diameter of said unit so that the unit is preliminarily positioned in said second portion and may then be slid into contact with said engagement means in said first window portion.

3. Assembly as claimed in claim 1, in which each of said axial grooves are the axial line between two rows of upper and lower axially extending protrusions on the circumferential surface of the unit, and notches are disposed at the opposite edges of said elongated window, said notches being effective to permit passage therethrough of at least one set of said upper and lower axial protrusions and to permit axially sliding said unit into engagement with said engagement means.

* * * * *